J. BIJUR.
ELECTRICAL SYSTEM FOR AUTOMOBILES.
APPLICATION FILED FEB. 2, 1911.

1,195,178.

Patented Aug. 22, 1916.
2 SHEETS—SHEET 1.

WITNESSES

INVENTOR
Joseph Bijur
BY
ATTORNEYS

J. BIJUR.
ELECTRICAL SYSTEM FOR AUTOMOBILES.
APPLICATION FILED FEB. 2, 1911.
1,195,178.
Patented Aug. 22, 1916.
2 SHEETS—SHEET 2.
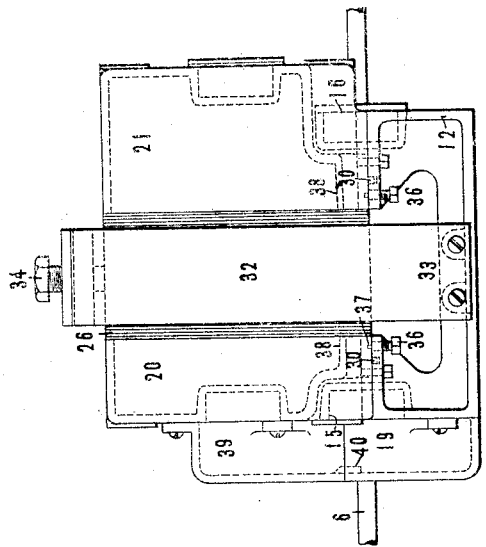
Fig-4-
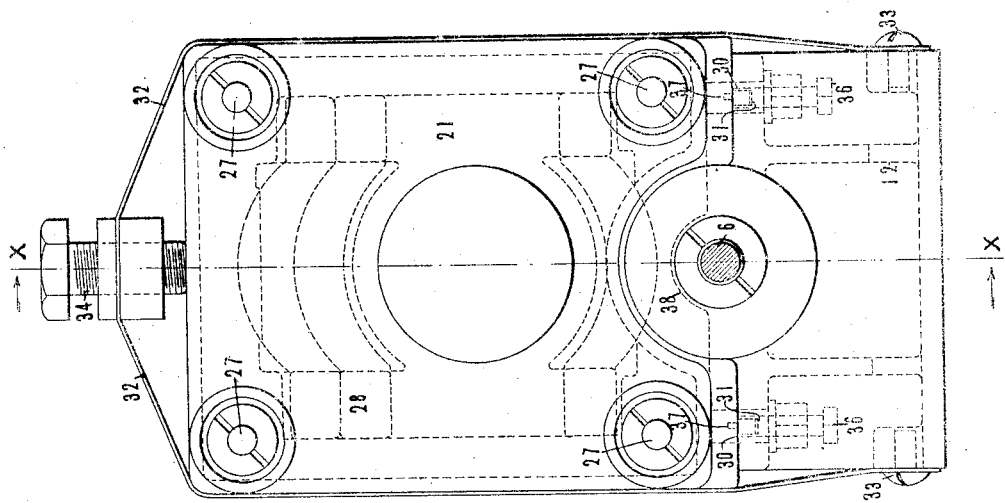
Fig-3-
INVENTOR
Joseph Bijur
BY
ATTORNEYS
WITNESSES
Henry Ryan

UNITED STATES PATENT OFFICE.

JOSEPH BIJUR, OF NEW YORK, N. Y., ASSIGNOR TO BIJUR MOTOR LIGHTING COMPANY, OF NEW YORK, N. Y., A CORPORATION OF NEW YORK.

ELECTRICAL SYSTEM FOR AUTOMOBILES.

1,195,178.  Specification of Letters Patent.  Patented Aug. 22, 1916.

Application filed February 2, 1911. Serial No. 606,123.

*To all whom it may concern:*

Be it known that I, JOSEPH BIJUR, a citizen of the United States, residing at New York, in the county of New York and State of New York, have invented certain new and useful Improvements in Electrical Systems for Automobiles, of which the following is a full, clear, and exact description, such as will enable others skilled in the art to which it appertains to make and use the same.

This invention relates to electrical systems for automobiles.

One of the objects thereof is to provide a practical and efficient electrical installation for automobiles in which the parts are compactly disposed and yet reliably driven at proper speed.

Another object is to provide apparatus of the above nature in which all of the parts are readily accessible and in which various portions of the apparatus can be removed without interfering with the operation of the remainder thereof.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
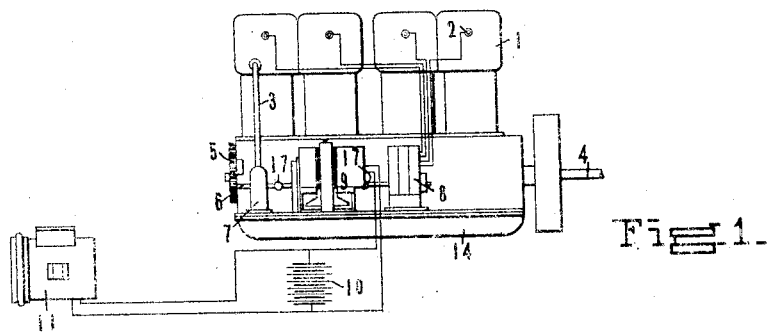
Figure 2:
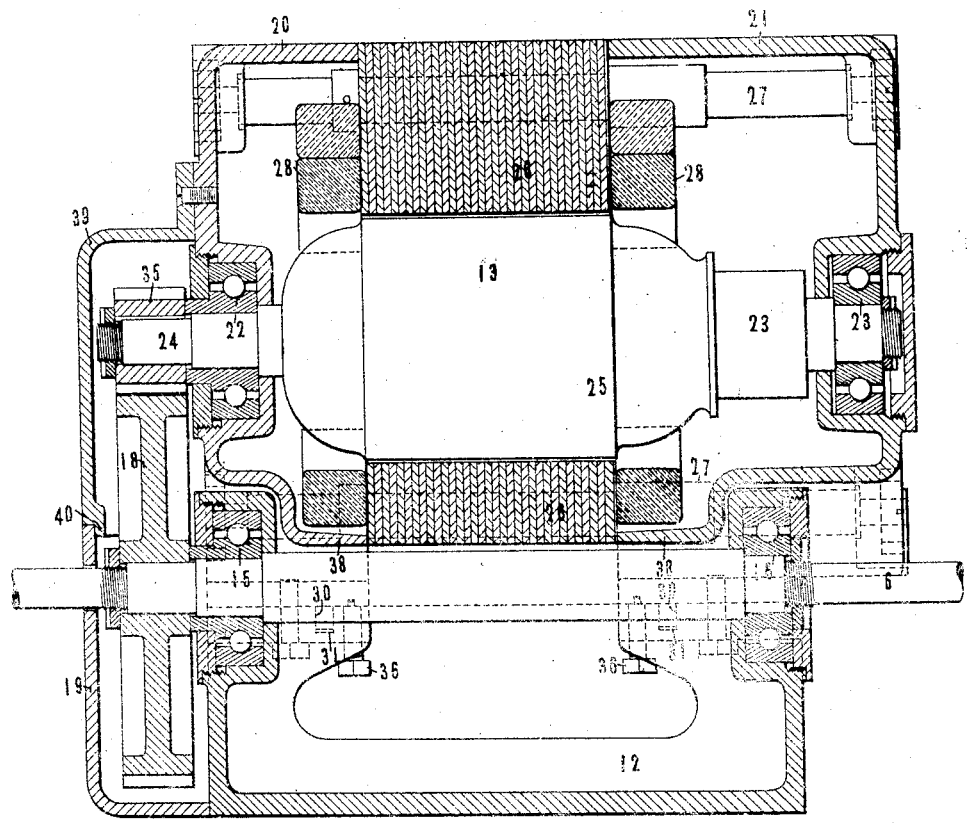

In the accompanying drawings, wherein is shown one of various possible embodiments of this invention, Figure 1 is a diagrammatic side elevation of an automobile-engine with electrical apparatus associated therewith. Fig. 2 is a sectional elevation of generating apparatus taken on the line X—X of Fig. 3. Fig. 3 is an end view of the same. Fig. 4 is a side elevation.

Similar reference characters refer to similar parts throughout the several views of the drawings.

Referring now to Fig. 1 of the drawings, there is shown an automobile-engine comprising the cylinders 1 provided with spark-plugs 2 and a water-circulating system 3 and the customary crank-shaft 4. Connected with this crank-shaft by the gearing 5 is a shaft 6 which extends adjacent the engine and preferably substantially parallel thereto. On the shaft is mounted a pump 7 which maintains circulation in the system 3. Through this pump the shaft 6 passes and extends to a magneto electric machine 8 which generates current for the spark-plugs 2. This device is preferably mounted at the end of the shaft. Between pump 7 and magneto 8 there is mounted electrical generating apparatus 9, which supplies current to a storage or secondary battery 10 and the automobile lamps 11. Considering now the construction of this generating apparatus 9 and its mounting upon, and drive from, the shaft 6, reference is made to Fig. 2 of the drawings. This apparatus comprises, broadly, a supporting bed 12 and a generating portion 13 mounted thereon. Supporting bed 12 is mounted in position, as upon the crank case 14 of the engine, and has formed therein ball-bearings 15 and 16 for the shaft 6. In the latter shaft, at each end of the apparatus 9, are formed couplings 17 to permit the ready assembly and removal of the various parts. Secured to shaft 6 is a gear 18 which preferably runs in oil in a casing 19 formed on or held against the bed 12.

The upper portion of the generating apparatus comprises the end casings or heads 20 and 21 having journaled therein, as at the bearings 22 and 23, an armature shaft 24 bearing the armature 25. These heads are separable in a direction longitudinal of the shaft 24 and are removably held in position to embrace the field magnets 26 by means of bolts 27. Suitable coils 28 are provided for the excitation of the magnets 26 and a commutator 29 and other appurtenances of an electric generator are also provided but are not here described in detail, as they in themselves form no part of the present invention.

The generator casings are provided with lugs 30 which fit into suitable recesses 31 in the bed 12, preventing lateral displacement, while a broad strap 32 is secured to the bed, as by screws 33, and passes over the upper generator portion, engaging the top thereof through an adjusting screw 34. These various parts are so formed and proportioned that as the generating part is mounted upon the bed part the pinion 35 upon the armature shaft meshes with the gear 18 upon the driving shaft 6. A vertical adjustment of the two portions of the generating apparatus with respect one to another is provided by means of screws 36 110 which are threaded through the upper portion of the bed case and rest freely in corresponding recesses in the generating casings, these screws preferably having pins 37 formed in their upper ends.

In the use of the apparatus the bed 12, which is fitted between the pump 7 and magneto 8, holds the shaft in alinement, and, as the above noted, is preferably rigidly bolted to the crank case of the engine. The generator is mounted upon this bed and its pinion meshing with the gear 18 permits the armature to be driven as the shaft 6 is driven through the gearing 5. These gears are of such ratio as to attain the desired speed of drive of the generator for greatest efficiency, and compactness of construction, and it may be noted that the upper portion of the generating apparatus is recessed, as at 38, to permit the shaft to reach the desired distance from the armature shaft without having the driving pinion of such size as to project beyond the sides of the apparatus and consume unnecessary space. The driving gear for the generator preferably runs in oil and a casing 39 is removably bolted or screwed against the upper portion of the generator and interlocks with the casing 19, as by the depending flange 40. The proper speed of drive of the generator is thus attained without the necessity for changing the rate of drive of the shaft 6 from that best suited for the action of the magneto 8 and pump 7, and although power is thus tapped from this driving shaft, there remains a free end thereof such as is best adapted for driving a magneto. It will be seen that the various parts are readily accessible and the upper portion or generating portion of the apparatus may readily be removed and other apparatus substituted. The relation of the gears, moreover, may readily be adjusted to bring the point of contact of their teeth precisely at the proper pitch line.

It will thus be seen that there is provided apparatus in which the aims of this invention are achieved, and that this apparatus is of an essentially practical and durable character and thoroughly reliable in action.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In apparatus of the class described, in combination with an automobile engine, a shaft driven by gearing from the crankshaft of said engine and extending adjacent thereto, a magneto electric machine for said engine at the end of said shaft and driven therefrom, a dynamo electric machine adjacent said shaft and interposed between said gearing and said magneto and driven from said shaft, and couplings formed in said shaft at each end of said dynamo electric machine.

2. In apparatus of the class described, in combination with an automobile engine, a shaft driven by gearing from the crankshaft of said engine and extending adjacent thereto, a magneto electric machine for said engine at the end of said shaft and driven therefrom, and a dynamo electric machine adjacent said shaft and interposed between said gearing and said magneto and driven from said shaft, said dynamo electric machine comprising two relatively detachable parts fitted about said shaft, one of which forms a supporting bed and the other of which comprises the field magnets and armature.

3. In apparatus of the class described, in combination with an automobile engine, a shaft driven by gearing from the crankshaft of said engine and extending adjacent thereto, a magneto electric machine for said engine at the end of said shaft and driven therefrom, and a dynamo electric machine adjacent said shaft and interposed between said gearing and said magneto and driven from said shaft, said dynamo electric machine comprising two relatively detachable parts, one of which forms a supporting bed and is provided with bearings for said shaft and the other of which comprises the field magnets and armature.

4. In apparatus of the class described, in combination with an automobile engine, a shaft driven by gearing from the crankshaft of said engine and extending adjacent thereto, a magneto electric machine for said engine at one end of said shaft, a dynamo electric machine interposed between said gearing and said magneto and through which said shaft passes, and means adapted to drive said dynamo electric machine from said shaft.

5. In apparatus of the class described, in combination with an automobile engine, a shaft driven by gearing from the crankshaft of said engine and extending adjacent thereto, a magneto electric machine for said engine at the end of said shaft and driven therefrom, a dynamo electric machine adjacent said shaft and interposed between said gearing and said magneto, a gear upon said shaft, said dynamo electric machine comprising a supporting bed upon which said shaft is mounted and a generating portion removably secured to said bed, a gear connected with the armature shaft and positioned to mesh with said first gear as said generating portion is placed in position upon said bed, and a casing through which said first shaft passes removably held in position to inclose said gears.

6. In apparatus of the class described, in combination with an automobile engine, a shaft driven by gearing from the crank-shaft of said engine and extending adjacent thereto, a magneto electric machine for said engine at the end of said shaft and driven therefrom, a dynamo electric machine adjacent said shaft and interposed between said gearing and said magneto and driven from said shaft, said dynamo electric machine comprising two relatively detachable parts fitted about said shaft, one of which forms a supporting bed and the other of which comprises the field magnets and armature, and said driving means comprising a pair of gears respectively mounted upon said first shaft and upon the armature shaft, and a removable casing inclosing said gears through which said first shaft passes.

7. In apparatus of the class described, in combination with an automobile engine, a shaft driven by gearing from the crank-shaft of said engine and extending substantially parallel thereto, a magneto electric machine for said engine at one end of said shaft and driven therefrom, a supporting bed mounted between said magneto and said gearing and having said shaft journaled therein, a gear upon said shaft adjacent said supporting bed, an electric generator formed to fit detachably upon said bed and provided with a gear operatively connected with its armature shaft and positioned to mesh with said first gear with said generator mounted upon said bed, and a removable casing inclosing said gears through which said first shaft passes.

8. In apparatus of the class described, in combination with an automobile engine, a shaft driven by gearing from the crank-shaft of said engine and extending adjacent thereto, an auxiliary device for said engine driven from said shaft, a dynamo electric machine removably mounted adjacent said shaft and interposed between said gearing and said auxiliary device and driven from said shaft, and means engaging said shaft between said gearing and said auxiliary device and adapted to hold said shaft in alinement with said dynamo electric machine removed.

9. In apparatus of the class described, in combination with an automobile engine, a shaft driven by gearing from the crank-shaft of said engine and extending adjacent thereto, an auxiliary device for said engine adjacent the end of said shaft and driven therefrom, and a dynamo electric machine adjacent said shaft and interposed between said gearing and said auxiliary device and driven from said shaft.

10. In apparatus of the class described, in combination with an automobile engine, a shaft driven by gearing from the crank-shaft of said engine, a pump connected with said engine through which said shaft passes, and an electrical generating apparatus mounted adjacent said pump upon the side remote from said gearing and driven from said shaft, said generating apparatus comprising two relatively detachable parts, one of which includes the field magnets and armature and the other of which forms a supporting bed.

In testimony whereof I affix my signature, in the presence of two witnesses.

JOSEPH BIJUR.

Witnesses:
L. A. WATSON,
J. THOMSON.